United States Patent [19]

Arakawa et al.

[11] Patent Number: 5,602,454
[45] Date of Patent: *Feb. 11, 1997

[54] BATTERY PACK HAVING IDENTIFICATION RECESSES AND TERMINALS

[75] Inventors: Hiroyuki Arakawa, Tochigi; Hidero Mitsui, Kanagawa, both of Japan

[73] Assignee: Sony Corporation, Japan

[ * ] Notice: The term of this patent shall not extend beyond the expiration date of Pat. No. 5,399,446.

[21] Appl. No.: 108,248

[22] Filed: Aug. 19, 1993

[30] Foreign Application Priority Data

Sep. 18, 1992 [JP] Japan .................................. 4-249896

[51] Int. Cl.$^6$ .................................................. H01M 10/48
[52] U.S. Cl. ................................. 320/2; 429/97; 320/48
[58] Field of Search .................................. 320/2, 48, 39; 429/7, 96, 97, 99, 100, 153, 163, 167, 170

[56] References Cited

U.S. PATENT DOCUMENTS

| | | |
|---|---|---|
| 2,225,460 | 12/1940 | Porth . |
| 2,266,686 | 12/1941 | Emanuel . |
| 3,667,026 | 5/1972 | Bogut et al. . |
| 3,917,990 | 11/1975 | Sherman, Jr. . |
| 4,006,396 | 2/1977 | Bogut .......................................... 320/2 |
| 4,123,598 | 10/1978 | Hammel ..................................... 429/159 |
| 4,315,364 | 2/1982 | Leffingwell ............................. 320/2 X |
| 4,329,406 | 5/1982 | Dahl et al. ............................. 320/48 X |
| 4,468,605 | 8/1984 | Fitzgerald et al. ......................... 320/36 |
| 4,530,034 | 7/1985 | Kawarada . |
| 4,576,880 | 3/1986 | Verdier et al. . |
| 4,637,965 | 1/1987 | Davis . |
| 4,737,420 | 4/1988 | Ikeda et al. . |
| 4,943,498 | 7/1990 | Cooper et al. . |
| 4,969,206 | 11/1990 | Desrochers . |
| 4,997,731 | 3/1991 | Machida et al. . |
| 5,057,383 | 10/1991 | Sokira . |
| 5,111,128 | 5/1992 | Branan, Jr. et al. ......................... 320/2 |
| 5,132,800 | 7/1992 | Wada et al. ............................. 358/209 |
| 5,136,620 | 8/1992 | Eaves ..................................... 320/39 X |
| 5,151,727 | 9/1992 | Sasaki ........................................ 354/76 |
| 5,183,714 | 2/1993 | Mitsui et al. . |
| 5,200,686 | 4/1993 | Lee ............................................. 320/2 |
| 5,208,116 | 5/1993 | Joh . |
| 5,227,262 | 7/1993 | Ozer . |
| 5,248,927 | 9/1993 | Takei et al. ................................. 320/2 |
| 5,341,171 | 8/1994 | Mori et al. ............................... 348/373 |
| 5,399,446 | 3/1995 | Takahashi ............................. 320/97 X |

FOREIGN PATENT DOCUMENTS

| | | |
|---|---|---|
| 0480706 | 4/1992 | European Pat. Off. . |
| 0549950 | 7/1993 | European Pat. Off. . |
| 0572327 | 12/1993 | European Pat. Off. . |
| 9112374 | 2/1992 | Germany . |
| 59-167098 | 9/1984 | Japan . |
| 352555 | 3/1991 | Japan . |
| 1487604 | 10/1977 | United Kingdom . |
| 9211679 | 7/1992 | WIPO . |

OTHER PUBLICATIONS

European Search Report, Sep. 9, 1993.
Sony Rechargeable Battery Pack, NP–55/55H/66/66H/77/77H Instruction Sheet, Sony Corporation, 1991.
EPO Search Report, Dec. 20, 1993.
Sony Rechargeable Battery Pack, NP–60D Instruction Sheet, 1992.

*Primary Examiner*—Edward H. Tso
*Attorney, Agent, or Firm*—Ronald P. Kananen

[57] ABSTRACT

The present invention is directed to a battery pack in which it can be detected with ease whether a battery pack is properly attached to a battery charger or a power supply of electrical machinery and apparatus. A battery pack (10) that accommodates therein a battery includes at its central bottom surface a detection aperture (104) that is engaged with an engagement portion formed at a connection portion of a battery charger or electrical machinery and apparatus to which the battery pack is connected to thereby detect the kind of the battery. Also, the battery pack (10) includes on its bottom surface a detection aperture (106) that is engaged with an engagement portion formed at a connection portion of the battery charger or electrical machinery and apparatus to which the battery pack is connected to thereby detect an electric power output amount of the battery.

21 Claims, 10 Drawing Sheets

| | | | Electrical Machinery and Apparatus (Built-in Camera Type VTR) | | Battery Charger | | |
|---|---|---|---|---|---|---|---|
| | | | Electric Power (Small) | Electric Power (Large) | Li Battery Only | Li/New Battery | Upward Compatibility |
| Li (Lithium) Battery | Electric Power (Small) | | ○ | × | ○ | ○ | ○ |
| | Electric Power (Large) | | ○ | ○ | ○ | ○ | ○ |
| New Battery | Electric Power (Small) | | ○ | × | × | ○ | × |
| | Electric Power (Large) | | ○ | ○ | × | ○ | × |
| Power Supply and Others | Output (Small) | | ○ | × | × | × | × |
| | Output (Large) | | ○ | ○ | × | × | × |
| Li Upward Compatibility | Electric Power (Small) | | ○ | × | × | ○ | ○ |
| | Electric Power (Large) | | ○ | ○ | × | ○ | ○ |

BATTERY PACK HAVING IDENTIFICATION RECESSES AND TERMINALS

BACKGROUND OF THE INVENTION

1. Field of the Invention

The present invention relates to a battery pack for use as a DC power supply for electrical machinery and apparatus and 1. Description of the Prior Art A conventional battery pack, previously proposed by the assignee of the present application, will be described below (see Japanese patent application No. 3-52555).

Figure 1:
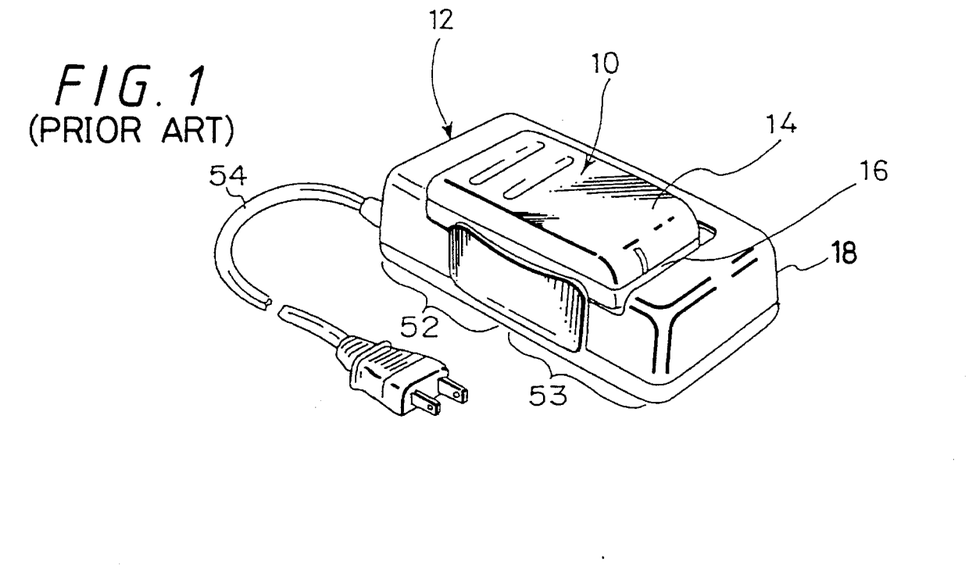
FIG. 1 is a perspective view illustrative of a conventional battery pack under the condition that it is attached to a battery charger.
Figure 2:
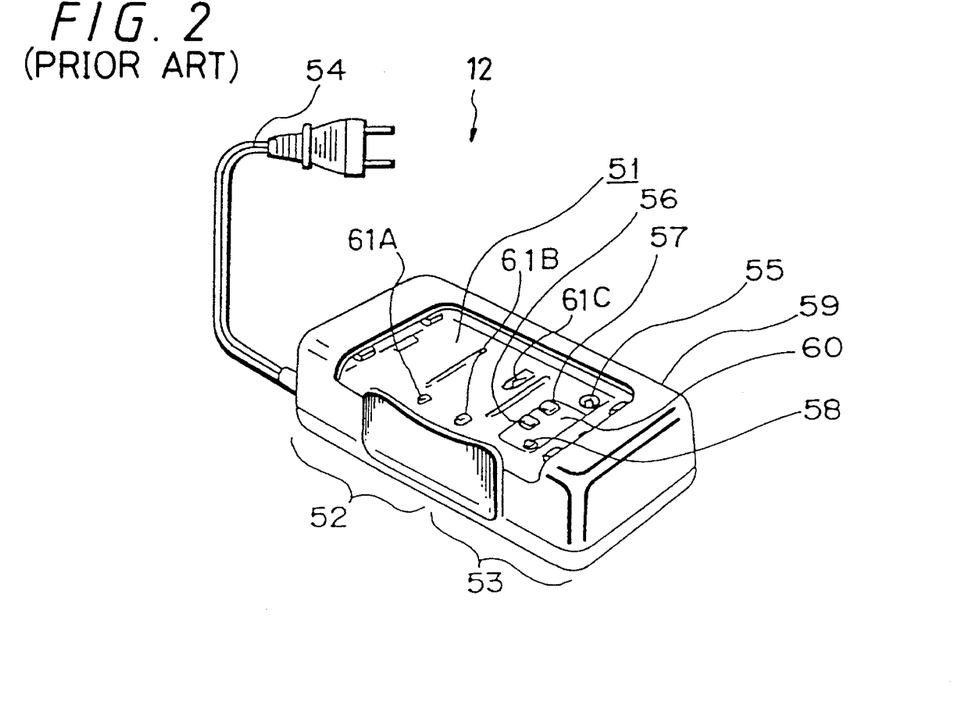
FIG. 2 is a perspective view illustrative of a conventional battery charger.

FIG. 1 of the accompanying drawings shows a battery pack 10 attached to, and charged by a battery charger 12. FIG. 2 shows an example of the battery charger 12.

As illustrated, the battery charger 12 is a molded product of a plastic material and includes a concave portion 51 on which the battery pack 10 is attached. The battery charger 12 includes a primary circuit unit 52 having a power supply transformer or the like and a secondary circuit unit 53 having a rectifying circuit or the like. The battery charger 12 further includes an AC cord 54 with a plug connected to the primary circuit unit 52.

As shown in FIG. 2, the secondary circuit unit 53 includes a DC power supplying adaptor plug 55, charging power supplying first and second terminals 56, 57, and a temperature detection signal input third terminal 58. The adaptor plug 55 is provided so that the electrical machinery and apparatus can directly use the DC power from the AC power supply without using the battery pack 10.

The three terminals 56 to 58 are each formed of, for example, a plate spring so that they can be deformed with resilience. A spring constant of the third terminal 58 is substantially ⅔ of those of the first and second terminals 56, 57. As shown in FIG. 2, the first to third terminals 56 to 58 are assembled into a mold plate 60 which is disposed on the bottom surface of the concave portion 51. Such mold plate 60 is colored with some suitable color different from a color "black" of a case 59 of the battery pack 10, such as "blue" or the like.

Though not shown, the second circuit unit 53 includes a control circuit. The control circuit is operated to control the charging of the battery accommodated within the battery pack 10. This control done by the control circuit is based on a so-called −ΔV charging completion method. That is to say, when the battery charging is started, a voltage between the first and second terminals 56, 57 is increased progressively. After the voltage reached to a peak value, the battery charging is ended when the voltage is decreased a little.

The aforesaid control circuit detects a temperature of the battery now being charged on the basis of a temperature detection signal from a temperature detecting element (not shown) disposed on the bottom surface of the battery pack 10. When a detected temperature exceeds a predetermined value, a charging current supplied from the first and second terminals 56, 57 to the battery is cut off and the charging done by the battery charger 12 is interrupted under the control of the control circuit.

As shown in FIG. 1, the battery pack 10 includes a case 18 that is formed of an upper case 14 and a bottom case 16 and is arranged such that a plurality of batteries are accommodated within the case 18.

Figure 3:
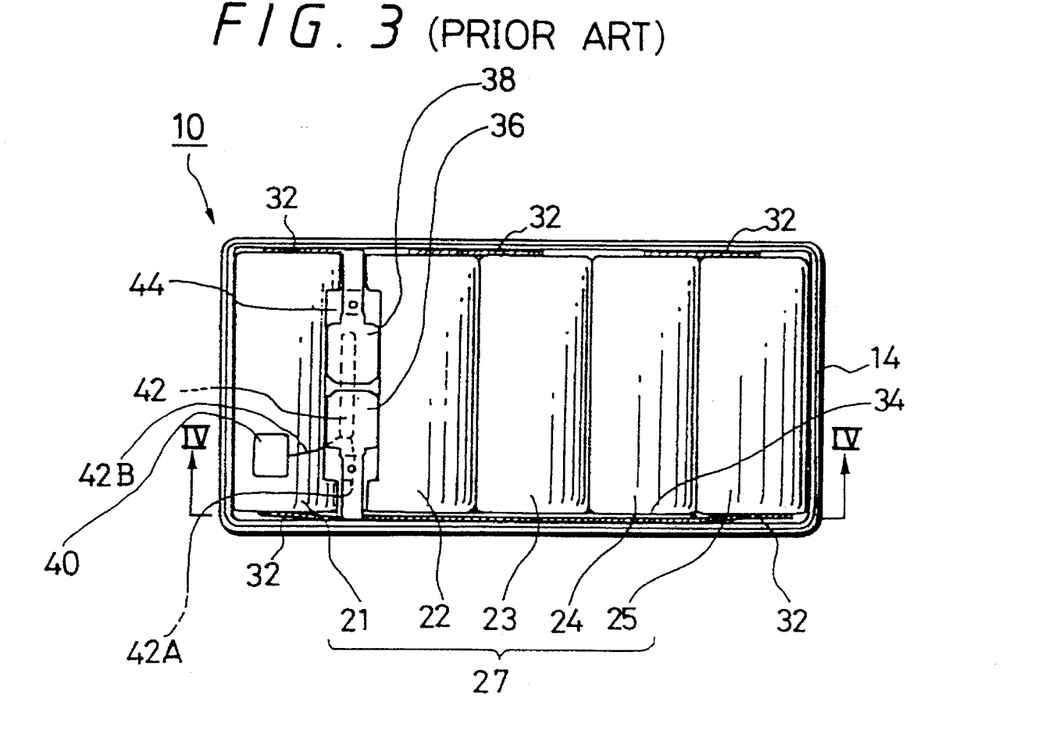
FIG. 3 is a plan view illustrative of the conventional battery pack.
Figure 4:
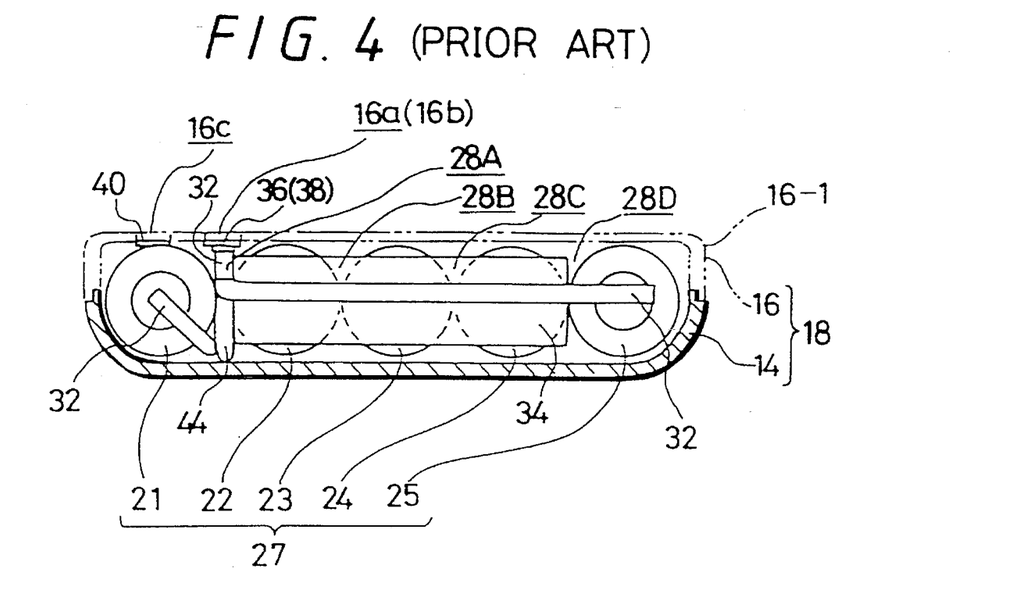
FIG. 4 is a cross-sectional view taken through the line IV—IV in FIG. 3.

FIGS. 3 and 4 show the battery pack 10 and the condition that columnar batteries 21 to 25 are accommodated in the inside of the battery pack 10. FIG. 3 shows the inside of the battery pack 10 with the bottom case 16 being removed, and FIG. 4 is a cross-sectional view taken along the line IV—IV in FIG. 3 and illustrating the battery pack 10, the batteries 21 to 25 and other elements and parts.

The batteries 21 to 25 might be nickel-hydrogen secondary batteries and are arrayed in a parallel fashion as shown in FIGS. 3 and 4. Electrodes of the batteries 21 to 25 are connected together via a conductive plate 32 and the five batteries 21 to 25 are arranged as a combined battery 27 in which the batteries 21 to 25 are electrically connected in series. An insulating sheet 34 is disposed between the electrodes of the batteries 21 to 25 and the conductive plate 32.

The combined battery 27 includes a first electrode 36 (positive electrode) and a second electrode 38 (negative electrode) for charging and discharging. On the under side of the two electrodes 36, 38, there are disposed a temperature detecting element 42 such as a thermistor or the like and a breaker (not shown). The first and second electrodes 36, 38, the temperature detecting element 42, the breaker (not shown) or the like are supported by a mold member 44 disposed between the two batteries 21, 22.

On the lower side of the battery 21 is disposed a third electrode 40 which derives a temperature detection signal. The third electrode 40 is formed as a thin plate to construct a plate spring and might be either directly bonded to the battery 21 by an adhesive or attached to the mold member 44.

The temperature detecting element 42 includes two lead wires 42A, 42B connected thereto. The temperature detecting element 42 is connected to the first electrode 36 by means of the first lead wire 42A and the temperature detecting element 42 is connected to the third electrode 40 by means of the second lead wire 42B. The combined battery 27 and the three electrodes 36, 38, 40 are disposed so as to come in contact with the inner surface of the upper case 14.

Figure 5:
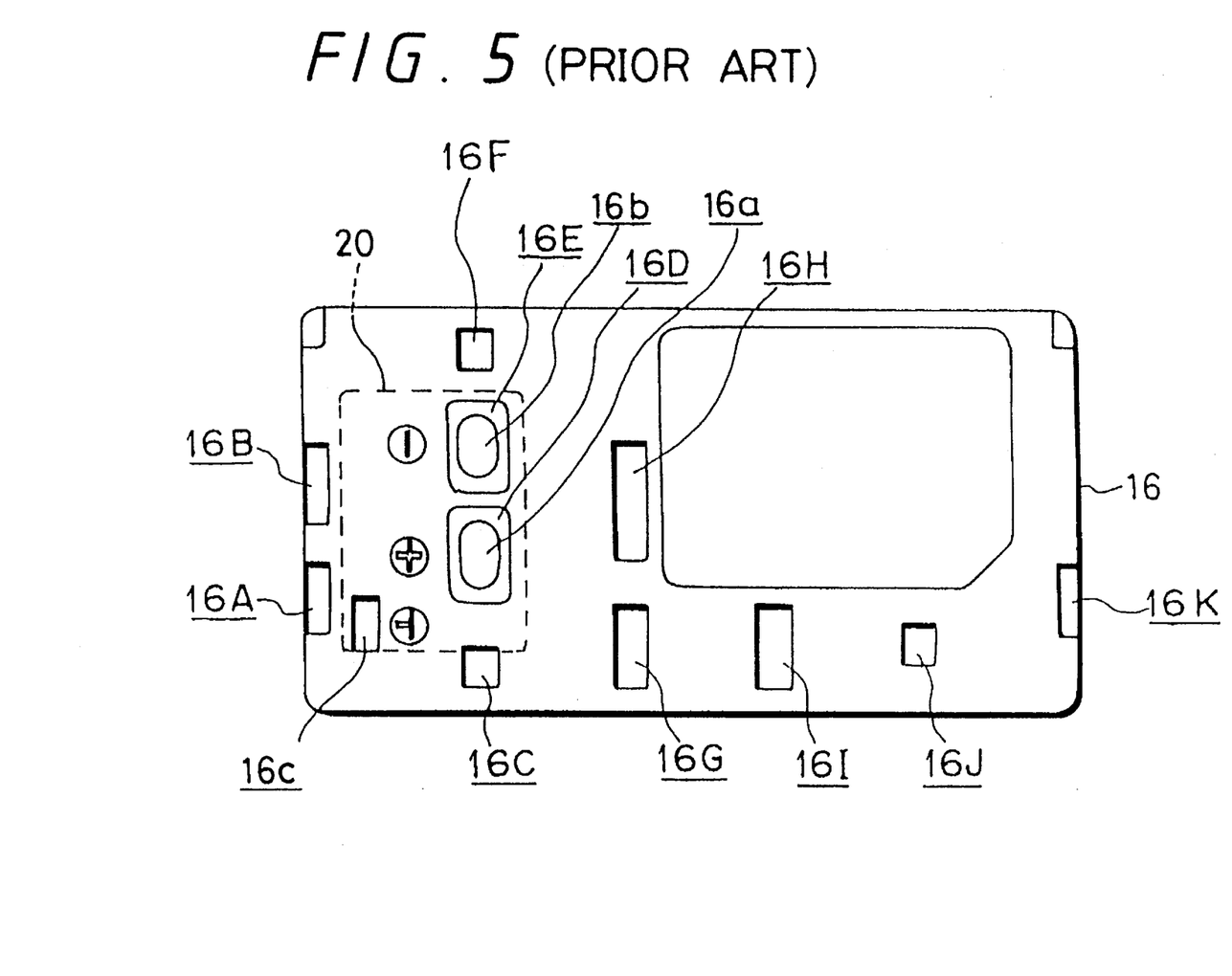
FIG. 5 is a bottom view illustrative of the conventional battery pack.

FIG. 5 shows a structure of a bottom surface of the case 18, i.e., an outer surface of the bottom case 16. The bottom case 16 has on its outer surface 11 concave portions 16A through 16K and three apertures 16a, 16b, 16c formed through its outer surface. The two apertures 16a, 16b are formed in the concave portions 16D, 16E, respectively.

The three apertures 16a, 16b, 16c are bored at the positions corresponding to the three electrodes 36, 38 and 40 of the battery pack 10. Therefore, when the case 18 is assembled by the upper case 14 and the bottom case 16 and the batteries 21 through 25 are disposed in the inside of the case 18, the three electrodes 36, 38 and 40 are exposed from the corresponding three apertures 16a, 16b, 16c, respectively.

The eight concave portions 16C to 16J and the two apertures 16a, 16b are disposed in association with spacings 28A through 28D between adjacent ones of the batteries 21 to 25.

As shown in FIG. 5, symbols +, −, ⊥, encircled by open circles, are marked neighboring three electrodes on the outer surface of the bottom case 16. These symbols are formed by the embossing processing when the bottom case 16 is molded by a plastic material.

The whole bottom case 16 is colored with "black", for example, and a dashed-line portion 20 that encircles the three apertures 16a, 16b, 16c are colored with other colors such as "blue".

On the bottom surface of the concave portion 51 of the battery charger 12, there are formed convex portions 61A, 61B, 61C as shown in FIG. 2. The convex portions 61A, 61B, 61C are disposed so as to engage with the corresponding concave portions 16I, 16G, 16H of the battery pack 10.

The outside concave portions 16I, 16G of the concave portions 16I, 16G, 16H are referred to as detection apertures, and the inside larger concave portion 16H is referred to as a locking aperture. The detection apertures 16I, 16G function to detect whether or not the battery pack 10 is properly attached to the battery charger 12.

In the battery pack that can be properly attached to the battery charger 12, the two convex portions 61A, 61B are respectively inserted into the corresponding detection apertures 16I, 16G and the bottom surface of the battery pack 10 is brought in contact with the bottom surface of the concave portion 51 of the battery charger 12. Meanwhile, in the battery pack 10 that is not properly attached to the battery charger 12, the two convex portions 61A, 61B are not inserted into the corresponding concave portions 16I, 16G and the bottom surface of the battery pack 10 is raised from the bottom surface of the concave portion 51 of the battery charger 12.

The locking aperture 16H functions to lock the battery pack 10 so that the battery pack 10 attached to the battery charger 12 is prevented from being moved during the battery pack 10 is being charged.

When the proper battery pack 10 is attached to the battery charger 12, the three electrodes 36, 38, 40 of the combined battery 27 exposed from the apertures 16a, 16b, 16c of the bottom case 16 are brought in contact with the three terminals 56, 57 and 58 of the battery charger 12, respectively.

Since at least either the three electrodes 36, 38, 40 or the three terminals 56, 57, 58 are formed of members that can be deformed resiliently, such as plate springs, the connection of both of them can be made reliable under spring-biasing force of such resilient members. As earlier noted, the spring constant of the third terminal 58 is selected to be smaller than those of other terminals so that, even when the battery pack 10 having no third electrode is mounted on the battery charger 12, the bottom surface of the battery pack 10 can be protected from being damaged.

In the illustrated conventional battery pack, the detection apertures 16I, 16G are provided on the bottom case 16 of the battery pack 10. When it is determined whether or not the convex portions 61A, 61B formed on the bottom surface of the concave portion 51 of the battery charger 12 are engaged into the detection apertures 16I, 16G, it is determined whether or not the battery pack 10 is properly attached to the battery charger 12. The aforesaid arrangement can be applied to a relationship between the battery pack 10 and the battery charger 12 and also applied to a relationship between the battery pack 10 and the electrical machinery and apparatus that utilizes the battery pack 10 as a power supply thereof.

When the battery pack 10 is not properly attached to the battery charger 12, the battery pack 10 is raised from the battery charger 12 by a height corresponding to the convex portions 61A, 61B and then inclined. If this inclination angle is large, then it can be detected with ease that the battery pack 10 is not properly attached to the battery charger 12. Conversely, if this inclination angle is small, then it becomes difficult to detect whether or not the battery pack 10 is properly attached to the battery charger 12.

In order to increase the inclination angle, the height of the convex portions 61A, 61B of the battery charger 12 must be increased and the depth of the detection apertures 16I, 16G of the battery pack 10 must be increased. If so, it becomes difficult to mold the battery charger 12 and the bottom case 16.

In order to increase the inclination angle of the battery pack 10 without changing the height of the convex portions 61A, 61B of the battery charger 12, the convex portions 61A, 61B of the battery charger 12 and the detection apertures 16I, 16G of the battery pack 10 must be disposed nearer the central position.

However, in the example of the prior-art battery pack 10, as shown in FIG. 5, the detection apertures 16I, 16G are formed adjacent to one side portion of the bottom case 16 of the battery pack 10 and are not formed at the central portion of the bottom case 16.

Furthermore, the battery pack 10 includes an identifying marker (not shown) attached thereto to indicate that the battery pack 10 had already been used or charged. Such identifying marker is attached to a front end portion 16-1 (see FIG. 4) of the bottom case 16 of the battery pack 10. Consequently, the battery pack 10 is unavoidably increased in size in the longitudinal direction by the amount corresponding to the protruded portion of the identifying marker.

OBJECTS AND SUMMARY OF THE INVENTION

Therefore, it is a general object of the present invention to provide an improved battery pack in which the aforesaid shortcomings and disadvantages encountered with the prior art can be eliminated.

More specifically, it is an object of the present invention to provide a battery pack in which it can be detected with ease whether a battery pack is properly attached to a battery charger or a power supply of electrical machinery and apparatus.

According to a first aspect of the present invention, there is provided a battery pack having a battery accommodated therein which comprises a detection portion formed at a central portion of a bottom surface of the battery pack, the detection portion being engaged with an engagement portion formed on a connection portion of a battery charger or electrical machinery and apparatus to which the battery pack is connected to detect the kind of the battery.

According to a second aspect of the present invention, there is provided a battery pack having a battery accommodated therein which comprises a detection portion formed at a bottom surface of the battery pack, the detection portion being engaged with an engagement portion formed on a connection portion of a battery charger or electrical machinery and apparatus to which the battery pack is connected to detect an electric power output amount of the battery.

The above and other objects, features, and advantages of the present invention will become apparent from the following detailed description of illustrative embodiments thereof to be read in conjunction with the accompanying drawings, in which like reference numerals are used to identify the same or similar parts in the several views.

DETAILED DESCRIPTION OF THE PREFERRED EMBODIMENTS

Embodiments of a battery pack according to the present invention will hereinafter be described with reference to the drawings, in which like parts corresponding to those of FIGS. 1 to 5 are marked with the same references and therefore need not be described in detail.

Figure 6:
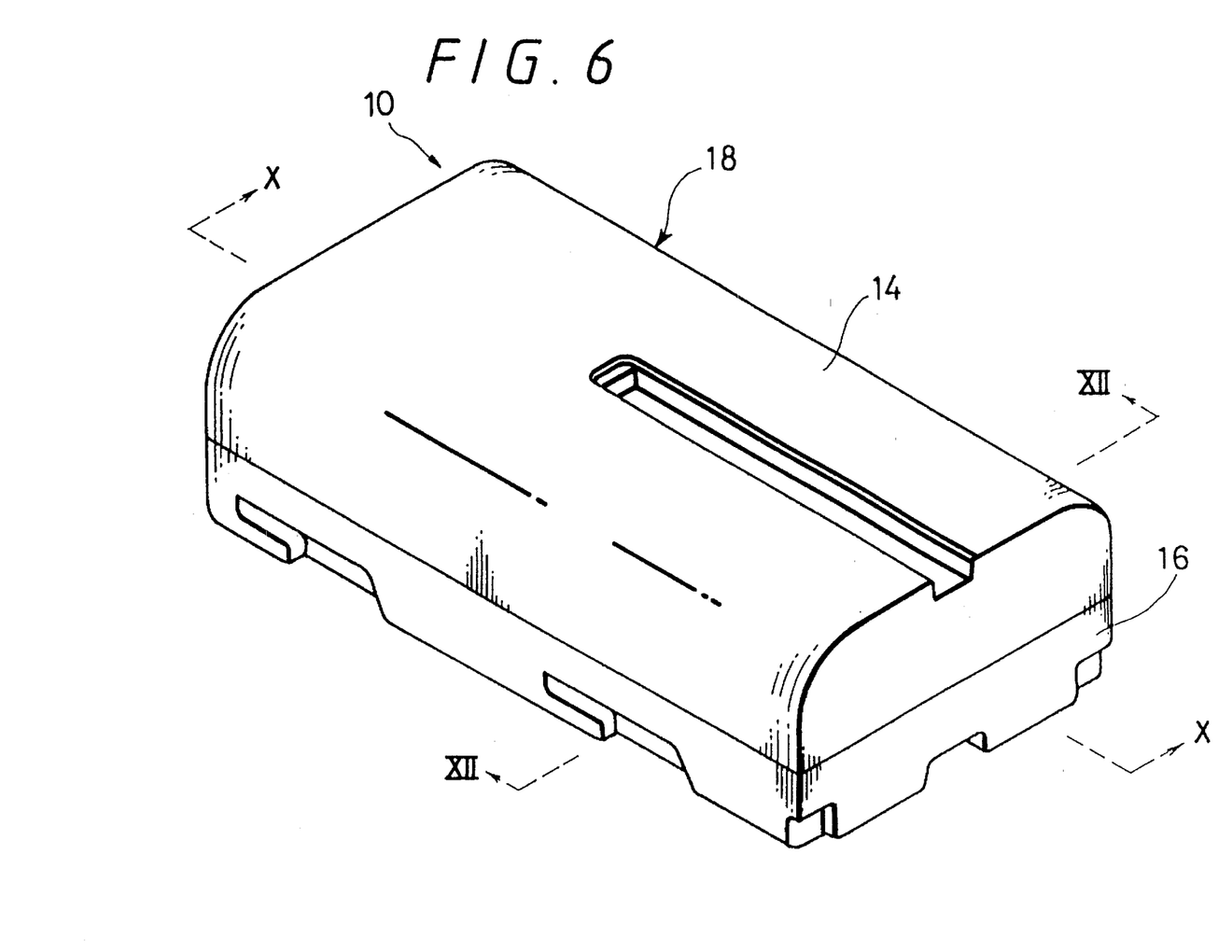
FIG. 6 is a perspective view illustrative of a battery pack according to an embodiment of the present invention.

FIG. 6 is a perspective view illustrating an appearance of an embodiment of the battery pack 10 according to the present invention. The battery pack 10 includes the case 18 which comprises the upper case 14 and the bottom case 16.

Figure 7:
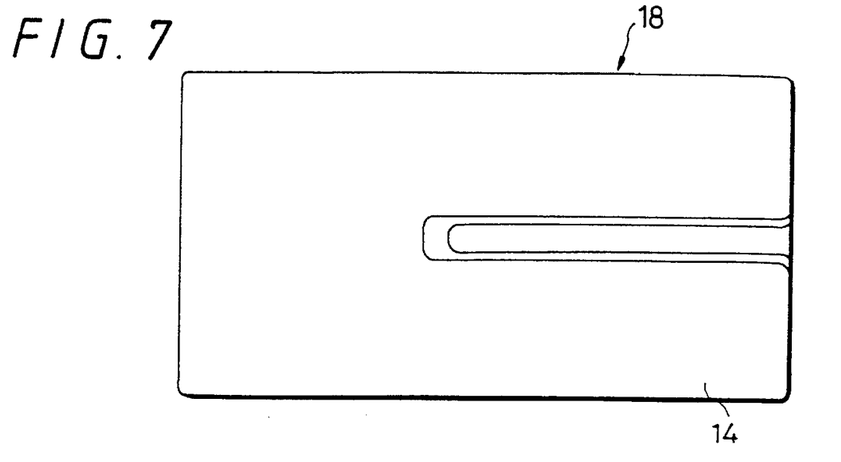
FIG. 7 is a plan view illustrative of the battery pack according to the embodiment of the present invention.
Figure 8:
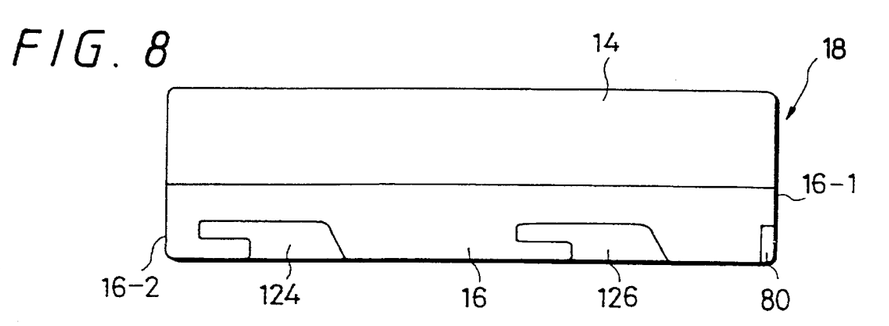
FIG. 8 is a side view thereof.
Figure 9:
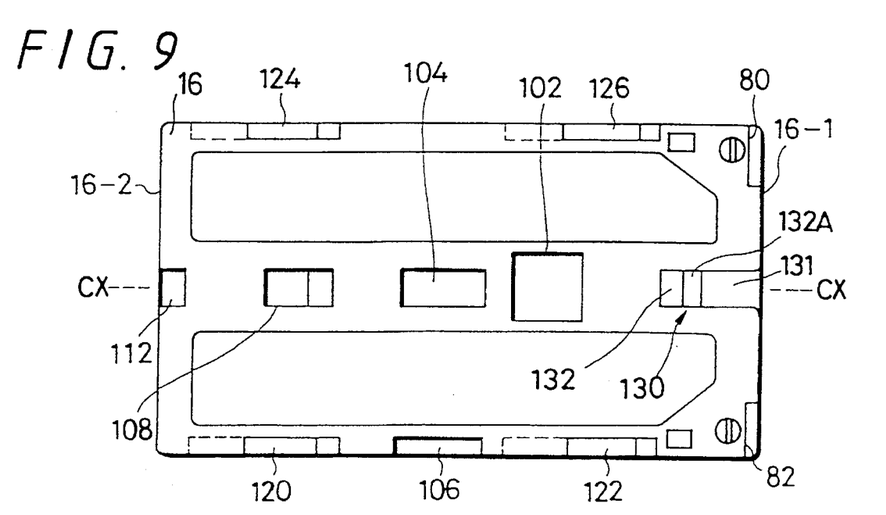
FIG. 9 is a bottom view thereof.
Figure 10:
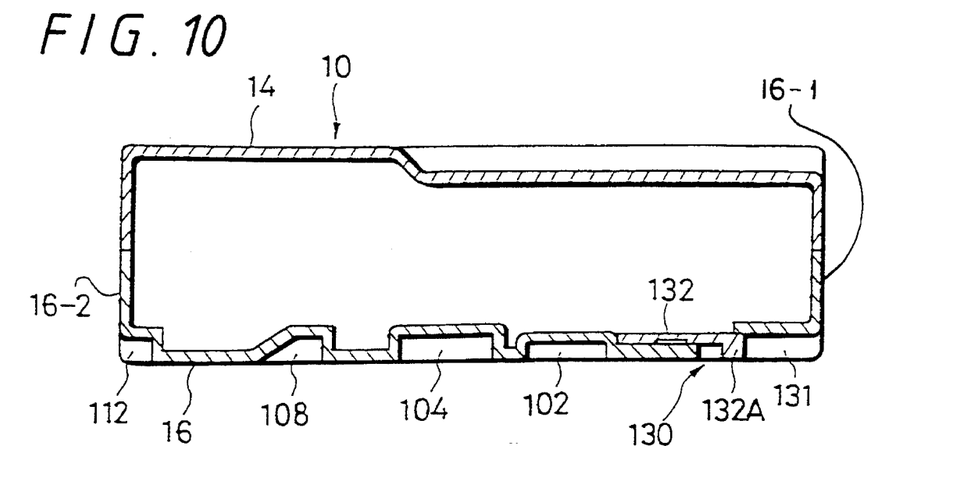
FIG. 10 is a cross-sectional view taken along the line X—X in FIG. 6.
Figure 11:
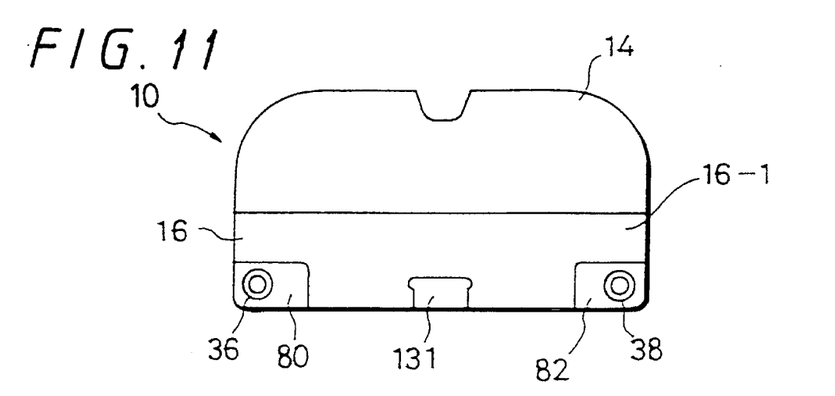
FIG. 11 is a front view of the battery pack according to the present invention.
Figure 12:
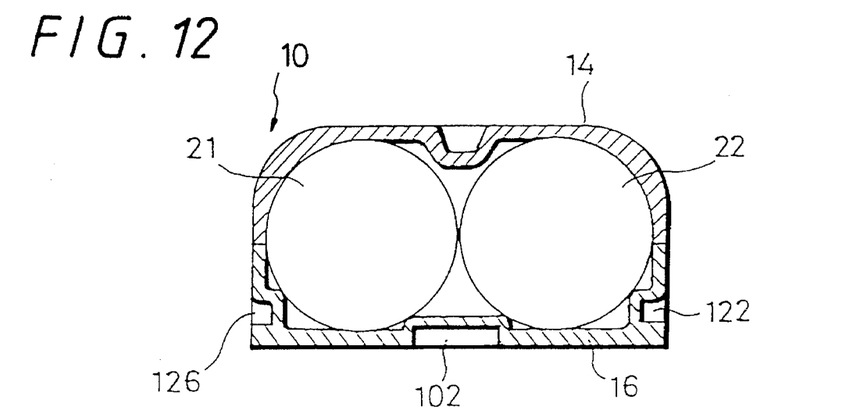
FIG. 12 is a cross-sectional view of the battery pack taken along the line XII—XII in FIG. 6.

FIGS. 7, 8 and 9 show the case 18 more in detail. FIG. 7 is a plan view thereof, FIG. 8 is a side view thereof and FIG. 9 is a bottom view thereof. FIG. 10 is a cross-sectional view of the battery pack 10 taken along the line X—X in FIG. 6, and FIG. 11 is a front view illustrating the battery pack 10 from its front end portion. FIG. 12 is a cross-sectional view of the battery pack 10 taken along the line XII—XII in FIG. 6.

As shown in FIG. 12, according to this embodiment, columnar batteries 21, 22 are arrayed in two rows within the battery pack 10 and four batteries are accommodated within the battery pack 10 in total. The four batteries might be connected in series to form a combined battery similarly to the example of the prior-art battery pack.

The battery pack 10 will be described with reference to FIGS. 9 and 10. In the bottom case 16 of the battery pack 10, concave portions 102, 104, 108, 112 are formed on the bottom surface along its center line CX—CX. A concave portion 106 is formed along one side portion of the bottom case 16. The concave portions 102, 104, 106 are detection apertures as detection units, and the concave portions 108, 112 are locking apertures, respectively.

More specifically, the detection aperture 102 is an auxiliary detection aperture and the detection aperture 104 is a detection aperture that is used to detect whether or not the battery is a lithium (Li) battery and the detection aperture 106 is a detection aperture that is used to detect whether or not the battery pack 10 is a battery. The functions the battery pack exhibits when the detection apertures 102, 104, 106 exist or not will be described later on.

When it is determined whether the detection apertures 102, 104, 106 are engaged with protruded portions formed on for example, a battery charger or other electrical machinery, it is determined whether the battery pack 10 is properly attached to the battery charger or electrical machinery. Therefore, when the battery pack 10 is not properly attached, the detection apertures 102, 104 and 106 are not disposed in a position opposite to corresponding protruded portions formed on the battery charger or the electrical machinery to which the battery pack 10 is to be connected, i.e., the bottom case 16 of the battery pack 10 becomes flat. Consequently, the battery pack 10 is inclined considerably so that it cannot be attached to the battery charger or the electrical machinery.

The battery pack 10 locks to the position at which it is attached to the battery charger or the electrical machinery and apparatus by the above-mentioned locking apertures 108, 112.

Around the bottom case 16, there are formed apertures 120, 122, 124 and 126, each of which has a rib. These apertures 120 through 126 are engaged with protrusions formed on a battery accommodating compartment and fixed thereto when the battery pack 10 is attached to the battery accommodating compartment of the battery charger or the electrical machinery and apparatus.

Concave portions 80, 82 are respectively formed on a front end portion 16-1 of the bottom case 16. The first and second electrodes 36, 38 of the combined battery are disposed on the bottom surfaces of these concave portions 80, 82 as shown in FIG. 11. The electrodes 36, 38 function as charging electrodes when the battery pack 10 is attached to and charged by the battery charger and also function as power supply electrodes when the battery pack 10 is attached to the electrical machinery and apparatus to supply an electric power to the electrical machinery and apparatus.

As shown in FIG. 9, an identifying marker 130 is provided on the central front end portion of the bottom case 16. It can be determined by this identifying marker 130 whether the battery pack 10 had already been charged or whether the battery pack 10 was discharged. In this embodiment, the identifying marker 130 is slidably disposed within a concave portion 131 and formed of a slider 132 having a protrusion 132A formed at the top thereof.

When the battery pack 10 had already been charged, the identifying marker 130 is protruded within the whole concave portion 131. When the battery pack 10 is in use or it was already discharged, the identifying marker 130 is moved backwardly into the battery pack 10 and protruded a little within the concave portion 131. If the battery pack 10 is removed from the battery pack 10 after the battery pack 10 had been connected to and charged by the battery charger, for example, then the protrusion 132A of the identifying marker 130 is engaged with an engagement member (not shown) formed on the battery charger and then the slider 132 is protruded so that the user can visually confirm the charging state of the battery pack 10. On the other hand, if the battery pack 10 is accommodated within the battery accommodating compartment of the electrical machinery and apparatus, the protrusion 132A of the identifying marker 130 is returned by a member (not shown). Therefore, the user can visually confirm whether the battery pack 10 has been discharged by removing the battery pack 10 from the above battery accommodating compartment.

Accordingly, if the surface of the slider 132 and the surface of the concave portion 131 are colored with different colors in the above-mentioned marker 130, then it can be recognized by color contrast whether the battery pack 10 is being charged or the battery pack 10 had been discharged.

Various examples of detection apertures of the battery pack 10 will be shown below and the function of the battery pack 10 will hereinafter be described with reference to FIGS. 13 to 18. Throughout FIGS. 13 to 18, the battery pack 10 is seen from the bottom case 16 thereof.

Figure 13:
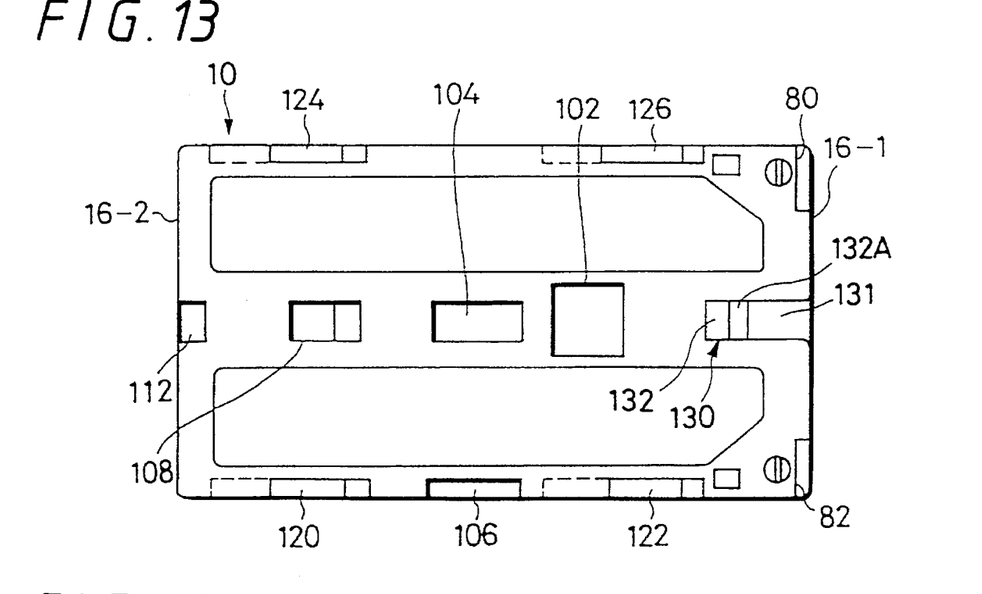
FIGS. 13 and 14 are respectively bottom views of battery packs of lithium cell type.

The battery pack 10 shown in FIG. 13 is the same as the battery pack 10 shown in FIG. 9. Since this battery pack 10 includes the detection aperture 104, battery accommodated within the battery pack is the lithium cell. Also, since this battery pack 10 has the detection aperture 106 formed one side portion thereof, the battery pack 10 has a battery function.

Figure 14:
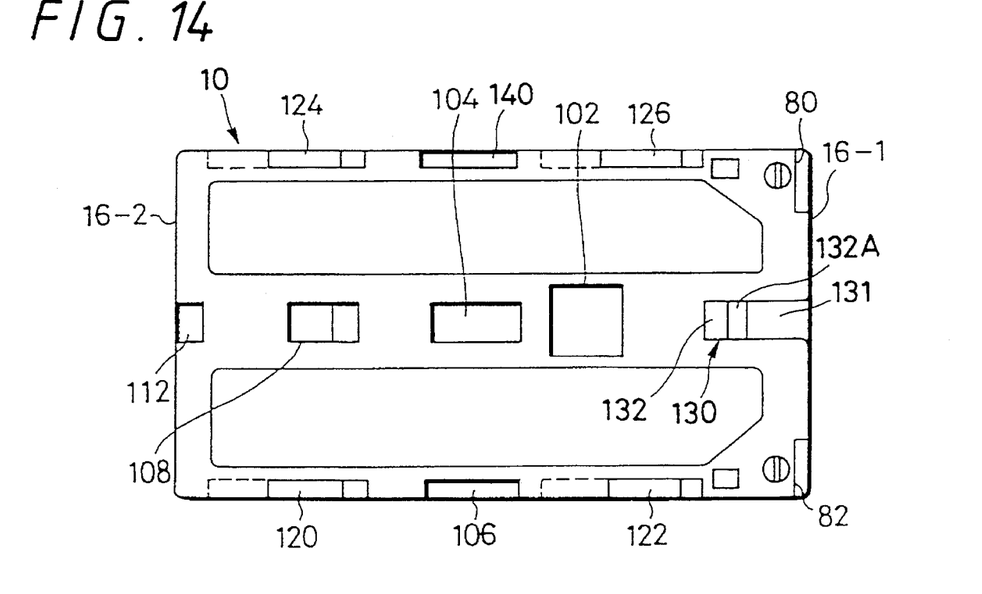

The battery pack 10 shown in FIG. 14 is different from the battery pack 10 shown in FIG. 13 only in that it includes a detection aperture 140 formed on the other side portion of the bottom case 16 in an opposing fashion to the detection aperture 106. The detection aperture 140 formed at the above position indicates that an electric power output amount of the battery in the battery pack 10 is large. Accordingly, since the battery pack 10 shown in FIG. 13 has no detection aperture 140, it is indicated by this battery pack 10 that the electric power output amount of the battery accommodated therein is small.

Figure 15:
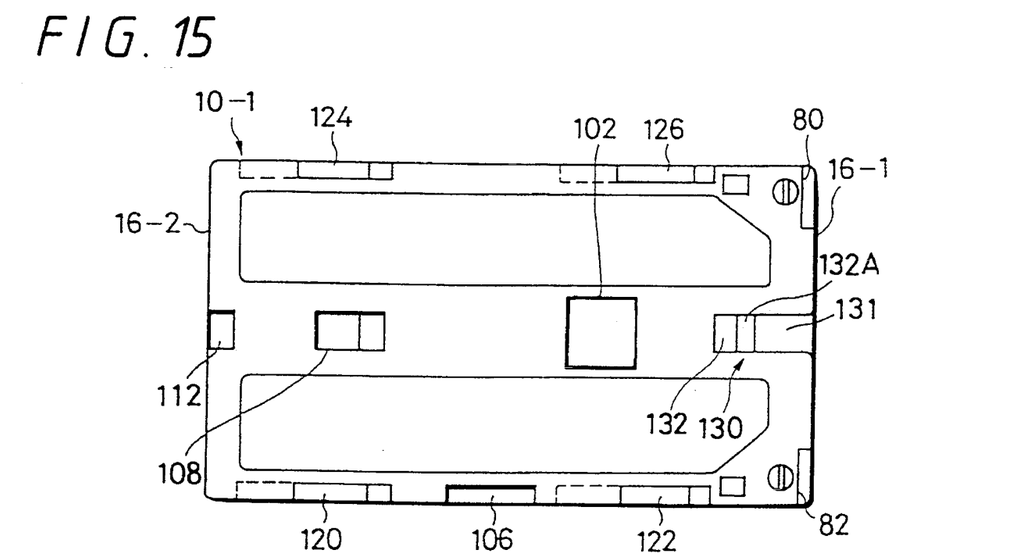
FIGS. 15 and 16 are respectively bottom views of battery packs of new cell type.
Figure 16:
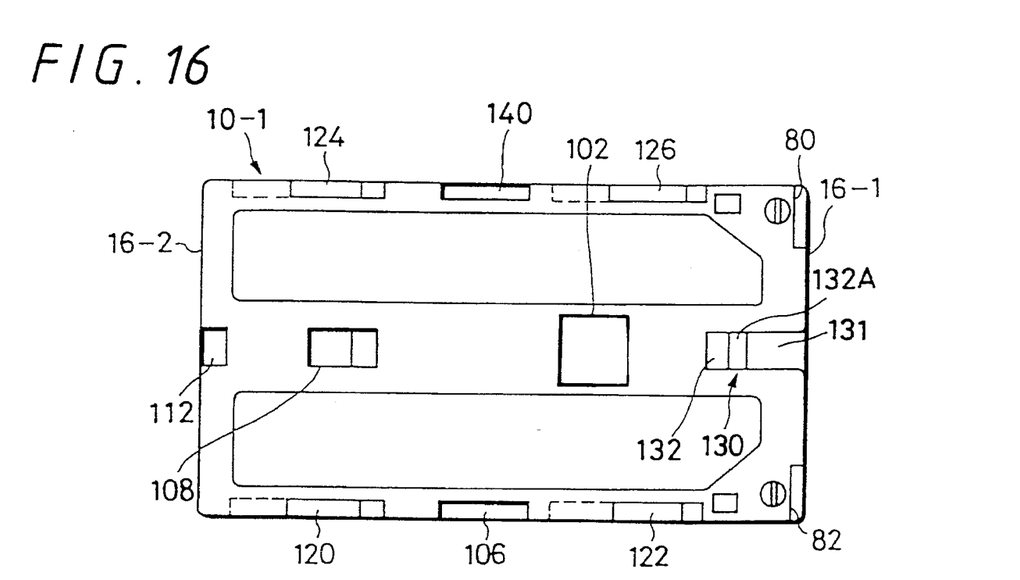

Battery packs 10-1 shown in FIGS. 15 and 16 have no detection aperture 104 and indicate that these battery packs 10-1 have new batteries that utilizes batteries such as Ni-Cd alkaline battery or the like other than the lithium battery. The battery pack 10-1 shown in FIG. 15 indicates that the electric power output amount of the battery is small and the battery pack 10-1 shown in FIG. 16 indicates that the electric power output amount of the battery is large.

Figure 17:
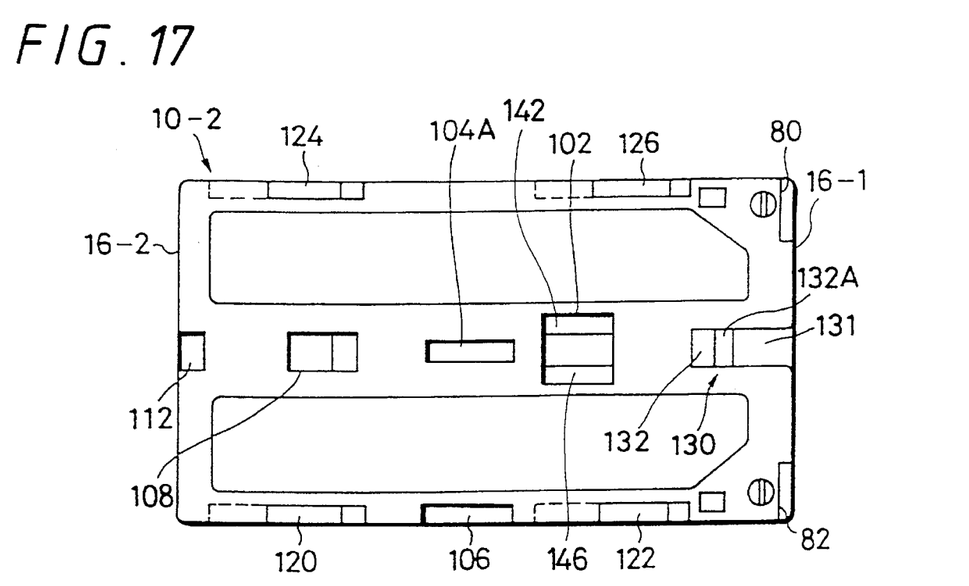
FIGS. 17 and 18 are respectively bottom views of battery packs of lithium upward compatibility type.
Figure 18:
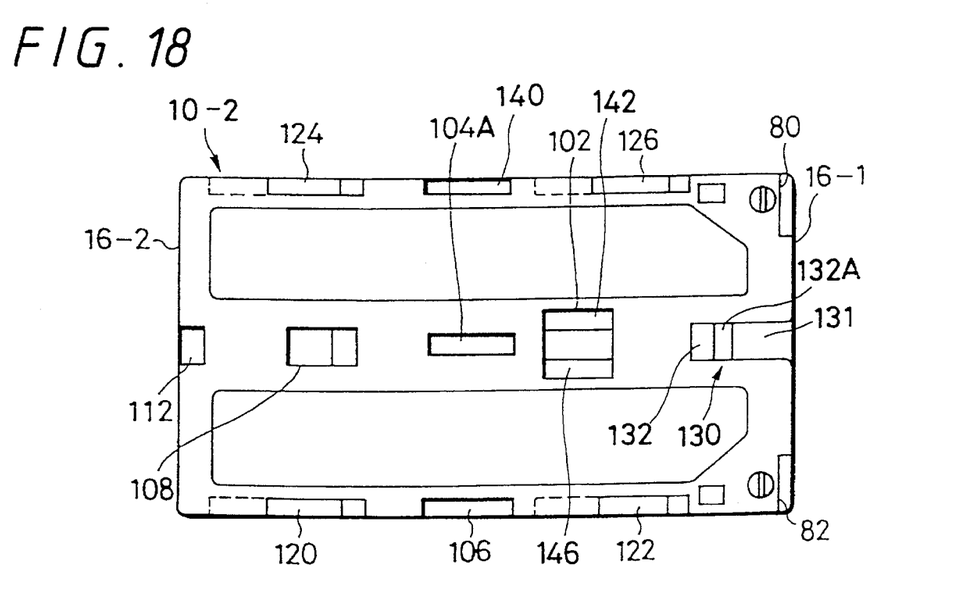

Further, in the battery packs 10-2 shown in FIGS. 17 and 18, the auxiliary detection aperture 102 includes an ID (identification) terminal 142 formed of, for example, an IC (integrated circuit) memory for memorizing the number of times that the battery has been charged and a temperature terminal 146 for detecting a heating temperature of the battery.

When the battery pack 10-2 is attached to the battery charger, the ID terminal 142 is connected to a detection element provided on the battery charger to allow the IC memory, provided on the battery pack side, to memorize the number of times the battery pack has been charged. When the battery pack 10-2 is attached to the battery charger, the temperature terminal 146 is connected to a temperature detection element such as a bimetal or the like to detect and display a temperature of the battery pack.

In battery packs 10-2 shown in FIGS. 17 and 18, the detection aperture 104 is formed as a detection aperture 104A which is reduced in width in the direction perpendicular to the longitudinal direction of the battery pack. The battery packs 10-2 have a compatibility with the battery pack 10 utilizing the lithium battery. The battery packs 10-2 also include two kinds of batteries whose electric power output amounts are large and small.

Figure 19:
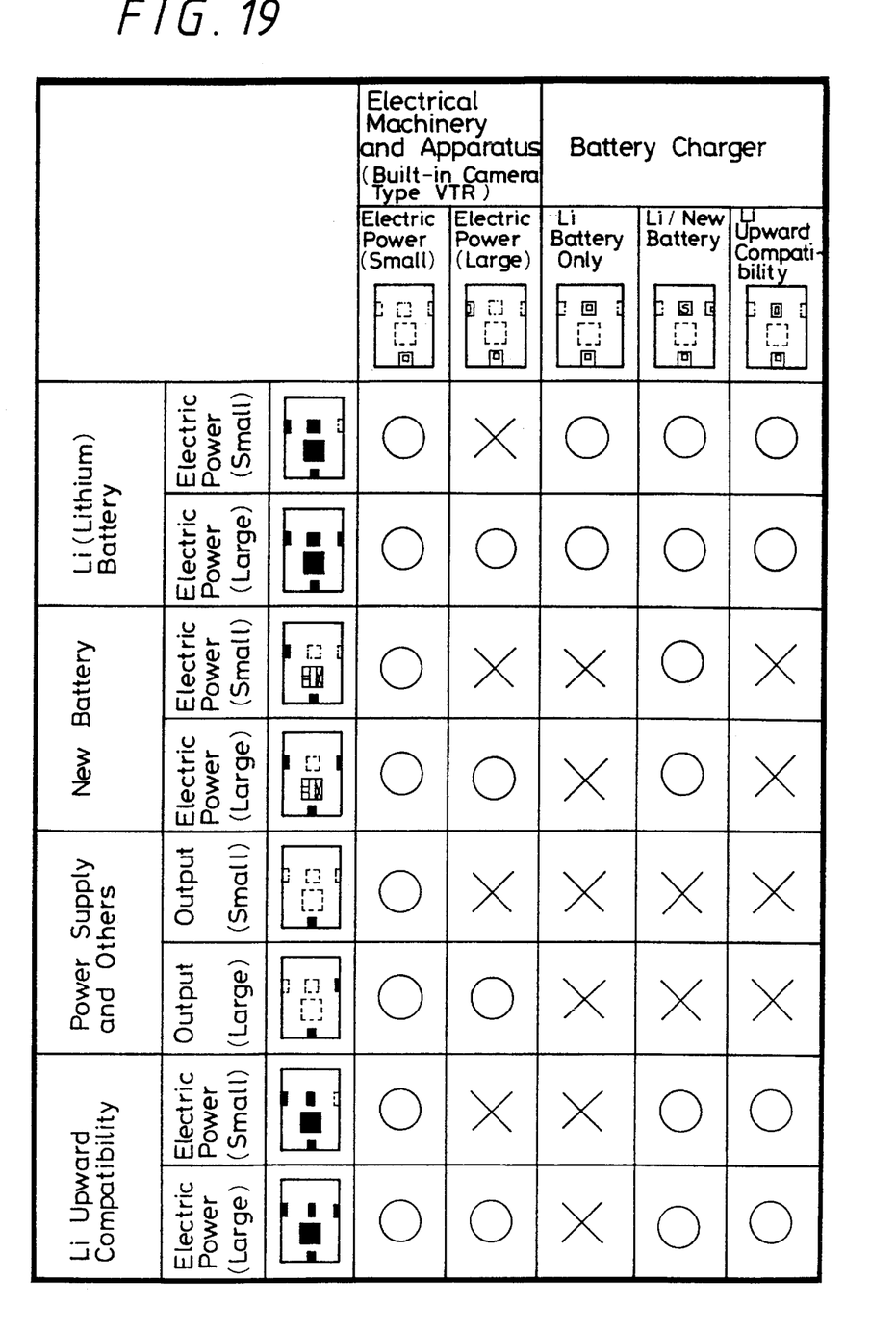
FIG. 19 is a table used to explain a relationship among battery chargers and electrical machinery and apparatus.

FIG. 19 shows in the form of a list the battery chargers and electrical machinery and apparatus to which the aforesaid battery packs 10, 10-1 and 10-2 can be attached. In FIG. 19, the battery packs 10, 10-1 and 10-2 are illustrated from the bottom case side and the locking apertures thereof are not shown in order to facilitate the understanding. A built-in camera type VTR (video tape recorder) is illustrated as an example of electrical machinery and apparatus and the battery charger and the electrical machinery and apparatus are represented by their connection surfaces to which the battery packs are coupled. The battery charger and the electrical machinery and apparatus are inverted in left and right from the drawings of battery packs. In FIG. 19, a double square represents the protruded portion, and a solid portion represents the detection aperture. A solid portion on the end porion of each battery pack represents the identifying marker 130. A dashed square represents a flat surface and a letter S in the square represents a detection switch that is used to identify the lithium battery and the new battery. Furthermore, a mark x in the square represents the temperature terminal 146 and an open circle in the square represents the ID terminal 142.

In FIG. 19, open circles represent the battery chargers and electrical machinery and apparatus that can be properly attached to the battery pack. Cross marks represent the battery chargers and electrical machinery and apparatus that cannot be properly attached to the battery pack.

In the battery charger in which the lithium battery and the new battery are used commonly, the battery pack 10 using the lithium battery and the battery pack 10-1 using the new battery can be identified by using the detection switch as follows.

That is to say, the battery pack 10 using the lithium battery and the battery pack 10-1 using the new battery can be identified by the status (on- or off-state) of the detection switch when the detection switch is brought in contact with or away from the battery pack. When the detection switch is provided on the flat surface of the battery charger, for example, the detection aperture 104 formed of the concave portion is opposed to the detection switch portion in the case of the battery pack using the lithium battery so that the detection switch is not brought in contact with the battery pack and remains in its off-state. In the case of the battery pack 10-1 using the new battery, the surface that opposes the detection switch is the flat surface so that the detection switch is brought in contact with the battery pack 10-1 and then turned on. The detection switch is not limited to those described above, and the detection switch may be provided within the concave portion so long as the detection switch can be turned on or off. Moreover, the detection switch is reduced in width so as to oppose the detection aperture 104A of the aforesaid compatible battery pack 10-2.

Further, if the protruded portion of the compatible battery charger using the lithium battery is reduced in width, then such battery charger can be properly attached to the battery pack 10-2. Also, such protruded portion can be engaged with the detection aperture 104 of the battery pack 10 using the lithium battery and hence such battery charger can be properly attached to the battery pack 10.

In FIG. 19, the power supply is not the battery and is a terminal plate serving as a power supply terminal. This terminal plate has to kinds of large and small electric power amounts and can be properly attached to the battery chargers and electrical machinery and apparatus shown in the table forming FIG. 19.

As set out, in the battery pack which accommodates therein the batteries, the detection portion that is engaged with the engagement portion formed at the connection portion of the battery charger or electrical machinery and apparatus to which the battery pack is connected to detect the kinds of batteries is provided at the central portion of the bottom surface of the battery pack. Therefore, it can be detected with ease whether the battery pack is properly attached to the battery charger or the electrical machinery and apparatus.

Furthermore, since the detection portion that is engaged with the engagement portion formed at the connection portion of the battery charger or the electrical machinery and apparatus to which the battery pack is connected is provided on the side portion of the bottom surface of the battery pack so as to detect the electric power output amount of the battery, it can be detected with ease whether the battery pack is properly attached to the battery charger or the electrical machinery and apparatus.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A battery pack having a battery accommodated therein comprising:

a detection portion formed at a central portion of a bottom surface of said battery pack, said detection portion engaging an engagement portion formed on a connection portion of an electrical apparatus to which said battery pack is connected, said detection portion being indicative of the type of said battery.

2. The battery pack according to claim 1, further comprising an identification terminal provided on a bottom surface of said battery, said identification terminal providing an indication that said battery has been charged in order to memorize a number of times that said battery pack has been charged.

3. The battery pack according to claim 2, wherein said identification terminal is provided substantially at said central portion of said bottom surface of said battery pack.

4. The battery pack according to claim 1, further comprising means for indicating an amount of charge remaining in said battery pack.

5. The battery pack according to claim 4, wherein said means for indicating an amount of charge remaining in said battery pack includes a movable identifying marker provided in a concave portion located on a casing, whereby the amount of charge remaining in said battery pack is indicated by a position of said identifying marker relative to said concave portion.

6. The battery pack according to claim 5, wherein said identifying marker comprises a sliding member having a protrusion formed on a top portion thereof.

7. The battery pack according to claim 1, wherein said detection portion physically hinders attachment of said battery pack to said apparatus if said battery pack is of a type not specified for use with said apparatus.

8. A battery pack having a battery accommodated therein comprising:

a detection portion formed at a bottom surface of said battery pack, said detection portion engaging an engagement portion formed on a connection portion of an electrical apparatus to which said battery pack is connected, said detection portion providing an indication of a total electric power output amount provided by said battery pack, wherein said detection portion physically hinders attachment of said battery pack to said apparatus if said power output of said battery pack is incompatible with said apparatus.

9. The battery pack according to claim 8, further comprising an identification terminal for providing an indication that said battery has been charged in order to memorize a number of times that said battery pack is charged, and further including a temperature detection terminal provided on said bottom surface for detecting a temperature at said bottom surface of said battery pack.

10. The battery pack according to claim 9, wherein said battery pack has a length defining a longitudinal direction, and wherein said detection portion is reduced in width in a direction perpendicular to the longitudinal direction of said battery pack.

11. The battery pack according to claim 10, wherein said electrical apparatus includes a battery charger and wherein the battery pack further comprises an identifying marker provided on said bottom surface of said battery pack, said identifying marker being slidably engaged with an engagement member of said battery charger to indicate whether the battery is charged.

12. A battery pack comprising:

a plurality of rechargeable batteries of a particular type;

a casing surrounding said rechargeable batteries;

said rechargeable batteries arranged in at least two rows within said casing;

means provided on said casing for attaching the battery pack to one of a battery charger and a device which receives power from said at least one rechargeable battery; and terminals provided on said casing which are coupled respectively to anode and cathode terminals of said at least one rechargeable battery;

wherein said casing comprises at least one recess formed on a bottom surface of said casing;

wherein the presence and position of said at least one recess is indicative of at least one characteristic of said battery pack; and wherein said at least one recess is located between or on either side of said rows.

13. The battery pack according to claim 12, wherein one of said recesses has a size indicative of the type of rechargeable batteries contained in said casing.

14. The battery pack according to claim 13, wherein the particular type of rechargeable batteries is one of a lithium battery or a nickel cadmium battery.

15. The battery pack according to claim 12, further comprising means disposed on said battery pack for providing an indication, when said battery pack is attached to a charger, of a number of times that said battery has been charged.

16. The battery pack according to claim 15, wherein said means for providing an indication of the number of times that said battery has been charged comprises an identification terminal operatively connected to an integrated circuit element provided in said casing, said integrated circuit element storing data representative of said number of times that said battery has been charged.

17. The battery pack according to claim 12 or 15, further comprising means for indicating an amount of charge remaining in said at least one battery.

18. The battery pack according to claim 17, wherein said means for indicating an amount of charge remaining in said at least one battery includes a movable identifying marker provided in a concave portion located on said casing, whereby the amount of charge remaining in said at least one battery is indicated by a position of said identifying marker relative to said concave portion.

19. The battery pack according to claim 18, wherein said identifying marker comprises a sliding member having a protrusion formed on a top portion thereof.

20. The battery pack according to claim 12, wherein at least one of said recesses has a depth greater than a distance between a surface of said plurality of batteries and an exterior of said casing.

21. The battery pack according to claim 12, wherein at least one of said recesses has a depth greater than a distance between a surface of said plurality of batteries and an exterior of said casing, and is located substantially in a center portion of the bottom of said casing.

* * * * *